United States Patent [19]

Friedman et al.

[11] Patent Number: 5,455,600
[45] Date of Patent: Oct. 3, 1995

[54] METHOD AND APPARATUS FOR MAPPING COLORS IN AN IMAGE THROUGH DITHERING AND DIFFUSION

[75] Inventors: Steven J. Friedman, Bellevue; Karen A. Hargrove; Joseph M. Joy, both of Redmond; Nathan P. Myhrvold, Bellevue; Sunita Shrivastava, Redmond; Gideon A. Yuval, Mercer Island, all of Wash.

[73] Assignee: Microsoft Corporation, Redmond, Wash.

[21] Appl. No.: 68,925

[22] Filed: May 27, 1993

Related U.S. Application Data

[63] Continuation of Ser. No. 996,984, Dec. 23, 1992, abandoned.

[51] Int. Cl.[6] .................................................. G09G 1/28
[52] U.S. Cl. ........................................... 345/153; 345/199
[58] Field of Search ..................................... 345/150, 153, 345/154, 155, 132, 199; 358/500, 518, 522, 523, 524, 455

[56] References Cited

U.S. PATENT DOCUMENTS

| | | | |
|---|---|---|---|
| 4,733,230 | 3/1988 | Kurihara et al. | 345/150 |
| 4,843,379 | 6/1989 | Stansfield | 345/154 |
| 5,031,050 | 7/1991 | Chan | 358/500 |
| 5,138,303 | 8/1992 | Rapel | 345/155 |
| 5,164,717 | 11/1992 | Wells et al. | 358/455 |

OTHER PUBLICATIONS

*Digital Halftoning* by Robert Ulichney, Second printing 1988; Chapters 1, 5, 6, and 7.
*Computer Graphics: Principles and Practice* by Foley, van Dam, Feiner, and Hughes, Reprinted with corrections Nov., 1991; Chapter 13.
*Dithering for 12–Bit True–Color Graphics* by Wells, Williamson and Carrie of Sun Microsystems; IEEE Computer Graphics & Applications, Sep. 1991, pp. 18–29.

*Primary Examiner*—Richard Hjerpe
*Assistant Examiner*—Regina Liang
*Attorney, Agent, or Firm*—Klarquist Sparkman Campbell Leigh & Whinston

[57] ABSTRACT

A high color resolution image is accurately approximated with a low resolution image through a unique combination of ordered dithering and error diffusion. The true color of each pixel is modified with error from previously rendered pixels and then dithered to an intermediate color of 15 bits. The intermediate color is then mapped to the nearest displayable color in a displayable color palette using a precomputed look-up table. Any error between a displayed color of a pixel and its true color is calculated and spread among neighboring pixels not yet rendered.

20 Claims, 2 Drawing Sheets

METHOD AND APPARATUS FOR MAPPING COLORS IN AN IMAGE THROUGH DITHERING AND DIFFUSION

This is a continuation of application Ser. No. 07/996,984, filed Dec. 23, 1992, now abandoned.

FIELD OF THE INVENTION

This invention relates generally to digital image processing. More particularly, this invention relates to a method and apparatus for accurately approximating a high color resolution or "true color" image with a low color resolution image on an output device such as a video monitor, printer or the like.

BACKGROUND OF THE INVENTION

The perceived quality of an image appearing on a computer video screen depends on the color resolution and spatial resolution of the video display hardware. Color resolution is measured by the number of colors that can be simultaneously displayed, or are "active" on screen. For example, an IBM-compatible personal computer with a VGA-based display system can simultaneously display 16 colors. A personal computer with a "super" VGA (SVGA)-based display system can simultaneously display 256 colors. Spatial resolution is measured by the number of individual pixels (picture elements) that can be placed across the screen. For example, a computer with a VGA-based display system can display 640 horizontal by 480 vertical pixels (640×480) on screen in its highest graphics mode. Higher spatial resolutions may be achieved with display systems following the SVGA, XGA and other graphics standards.

Color resolution is equivalently measured by the number of data bits for storing each pixel of the image in a computer's video memory (also known as the bit "depth" of the frame display buffer). Display systems with four bits per pixel can display only 16 simultaneous colors. Which 16 colors (out of the millions possible) are simultaneously displayed depends on the contents of a color look-up table (CLUT) that is addressed by the four-bit color value of the screen memory. The particular set of 16 colors within the look-up table is referred to as a displayable color palette, and it is possible to switch palettes to emphasize colors tailored to individual images on the display. For example, one color palette may better portray a polar bear in a snowstorm while another palette may better portray a brown bear in a cave. As the number of bits per pixel grows from four to eight to twelve, etc., the size of the displayable color palette and the number of simultaneously displayable colors grows.

However, application program interfaces provided by operating systems software can often support a much larger number of active colors than supported by VGA, SVGA and other low-bit display standards. The Microsoft Windows® program, for example, supports over 16 million active colors. An application such as a paint program using Windows® can specify 24 bits for each pixel of an image, typically eight bits in each color dimension of red, green, and blue. The specified bit values are called an RGB value (for red, green and blue), with each eight-bit value representing an intensity level of the respective color between 0 (zero intensity) and 1 (full intensity). Colors are specified by an ordered triple of values corresponding to the intensities of red, green and blue that are mixed to form the color. Red, for example has an RGB value of (1, 0, 0) while purple, which is half-intensity red and half-intensity blue, has an RGB value of (½, 0, ½).

In a typical computer system, color is quantized according to a color model such as red-green-blue (RGB). The range of colors displayable on the given monitor can be quantized within a three dimensional cube of red, green and blue intensity values according to the RGB model. Other color quantization models are also used and may be more suitable in certain applications. However, all the color models use a three dimensional representation of the color range, or gamut.

State-of-the-art display systems which go well beyond VGA and SVGA typically have 24 (or more) bits per pixel for displaying about 16.8 million colors simultaneously. They also provide a spatial resolution of 1280×1024 or higher. Such display systems are known as "true color" systems because they allow the actual color to be specified accurately and independently for each pixel. True color systems do not require color look-up tables because the values stored in the screen memory for each pixel directly indicate the color to appear on the screen. The colors are said to be "direct mapped." Direct mapping allows any pixel to be any color.

However, a major drawback of true color display systems is their cost. They require significant amount of video memory for a display buffer and an accelerator device. For desired spatial resolutions of 1024×768 or higher, such systems cost as much or more than an otherwise state-of-the-art personal computer system. True color systems may also perform at slower speeds than 8-bit display systems.

In the prior art, there have been different approaches taken to provide acceptable quality images without the cost of true color systems. One approach, mentioned above, is to vary the displayable color palette depending on the most common colors in an image to be displayed. Such an adaptive palette technique, however, produces undesirable effects if several images are to be simultaneously displayed on screen. Adapting the displayable color palette to an individual image on the display typically degrades the quality of the other images. And when the focus of the display is switched to one of the other images, the displayable color palette must be re-adapted to that image. Consequently, the quality of the image of the previous image becomes degraded in what is known as a "palette war."

A second approach is to truncate the 24 bits per pixel to eight or four bits by simply removing a sufficient number of least significant bits from each color dimension. The problem with truncation is that different intensities of the same color are lost.

A third approach is "ordered dithering." Dithering is a process for replacing a non-displayable color (one not within the present displayable color palette) with a displayable color within a defined area to simulate an average color. Ordered dithering takes into account additional factors in determining the replacement color, such as the relative location of the pixel being dithered within the image.

Yet another approach is "error diffusion" dithering. Error diffusion is a process for spreading, or diffusing, the error between the true color and the displayed color of a pixel to adjacent pixels in the image. Common error diffusion techniques include the Floyd-Steinberg filter, the Stucki filter, and the Burkes filter.

Although prior 4 and 8-bit display systems using these several approaches work to some degree, none has proven to be a satisfactory substitute for a true color system. Each produces artifacts, or unwanted visual byproducts, when an image is displayed with spatial resolution of 60 pixels per inch or greater (640×480 on a 13" monitor or 1024×768 on a 19" monitor). An object of this invention, therefore, is to provide a suitable technique for displaying near true color images using a minimum number of bits per pixel.

SUMMARY OF THE INVENTION

In accordance with the invention, a method of accurately approximating a higher color resolution image with a lower color resolution is shown and described. To accommodate error from error diffusion, the boundaries of a color gamut are doubled or otherwise increased. For each pixel of the high color resolution image, its true color is then read from a memory where the image is stored. The true color is modified with error diffused from previously rendered pixels. If the modified true color value exceeds the increased boundary of the color gamut, the color value is clamped to within the boundary. The modified true color is then dithered to an intermediate color. It may be determined via table look-up which displayable color of a displayable color palette is nearest to the intermediate color. The pixel is rendered using the displayable color. An error is calculated between the displayable color and the true pixel color and diffused to the not yet rendered neighboring pixels.

In the preferred embodiment, the dithering step is an ordered dithering. To speed determination of the nearest displayable color in the displayable color palette, a precomputed look-up table may be used in which each intermediate color is associated with a color number representing a displayable color. While a number of error diffusion techniques may be used, the preferred embodiment employs Floyd-Steinberg error diffusion.

The foregoing and other objects, features, and advantages of the invention will become more apparent from the following detailed description of a preferred embodiment which proceeds with reference to the accompanying drawings.

DESCRIPTION OF A PREFERRED EMBODIMENT

Figure 1:
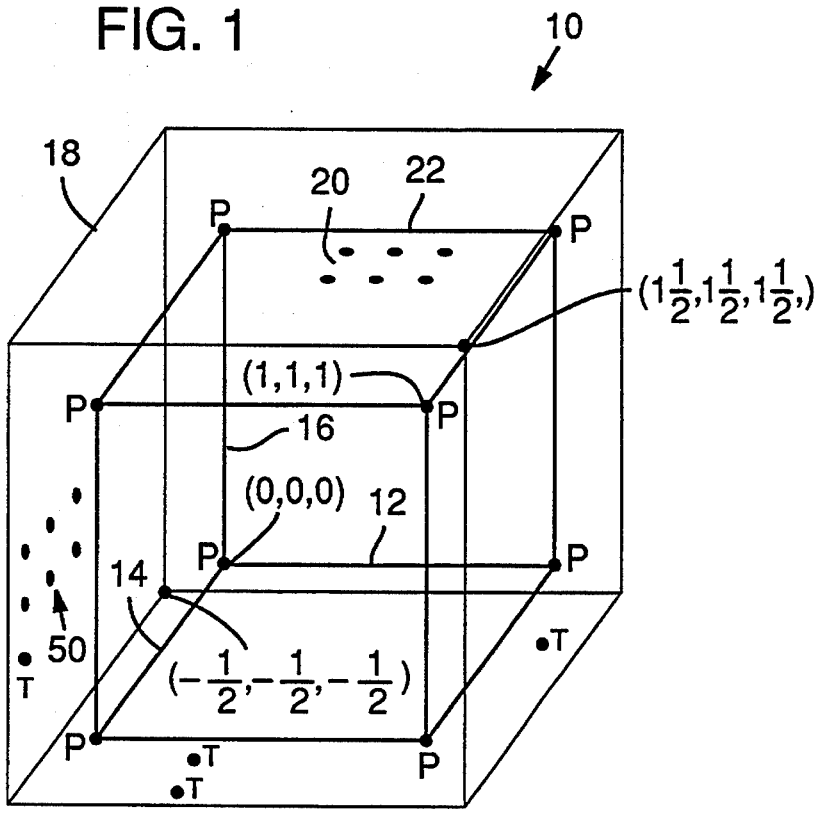
FIG. 1 is an illustration of a color model with twice the color range of a standard model.

FIG. 1 shows an RGB color model 10 in which colors are represented by ordered triples corresponding to the intensities of red, green and blue light that must be mixed to form the color. However, unlike the conventional color model whose intensity values range from zero for minimum intensity to one for full intensity, color intensity values in the color model 10 can range from –½ to 1½. The color model 10, in effect, has double the color range, or gamut, of a conventional color model. The model 10 includes three orthogonal axes—a red axis 12, a green axis 14 and a blue axis 16. The gamut of colors that may be represented by the model 10 lie within a cube 18. The RGB model is commonly used in computer systems since color monitors in such systems typically illuminate red, green and blue phosphors on their screens to various intensities to produce a desired color.

In a method that uses the color model 10, the present invention reproduces 24-bit "true color" images with fewer bits, such as with 4- or 8-bit color resolution. The true color image may exist in a computer system as a bitmap comprising a two dimensional array of 24-bit color values. In general, the bitmap is stored in a computer's main memory or as a file on a storage device. Each 24-bit color value comprises three 8-bit intensity values corresponding to red, green and blue intensity values of the RGB model 10. With 24-bit color values, the true color image has an initial palette of nearly 16.8 million colors. The colors of this initial palette are structured as a uniform grid in the model 10. The dots 20 represent some of these possible colors that lie within a smaller, inner cube 22 defined by the origin of the three axes and extending along each axis from zero to one intensity value.

In approximating 24-bit color images with a lower color resolution image, the invention utilizes a displayable color palette. With 4-bit color resolution, the displayable color palette has 16 simultaneously displayable colors of 24 bits each. Preferably the displayable color palette includes the eight corner colors of the cube 22, represented by dots P in FIG. 1, since these colors cannot be rendered by averaging other colors. The corner colors include black, white, red, green, blue, cyan, magenta and yellow. Beyond these colors, the other eight displayable colors can be freely chosen, such as half or three-quarter intensities of the corner colors. The colors in the displayable color palette may be changed at will.

In mapping a true color to a displayable color palette of fewer colors, errors are invariably introduced into the image. The present invention minimizes that error by using the extended color range of the color model 10 in conjunction with error-reducing techniques. Shown within the model 10 are modified, or error adjusted, true color values represented by the letter T. These values may exist anywhere within the gamut of model 10 and include the true color values of dots 20 as modified by an error diffusion process to be described. Because this error diffusion may result in reducing a color's several intensity values below zero or increasing them above one, the range of the color model 10 is double the normal range to accommodate these values. However, any intensity values that are less than –½ or exceed 1½ are clamped to these limits or other limits that may be chosen. The greater range of the color model 10 allows the diffused error to be measured more accurately. Without the greater range, some of the error would be lost through a truncation to the inner cube 22.

The determination of which palette color is nearest to a true color can be done by truncation or bit-shifting operations when a palette consists of colors that form a uniform grid in the RGB color model 10. However, with palettes that do not consist of a uniform grid of colors, the determination of which palette color is nearest to a true color usually cannot be done with a simple truncation or bit-shifting operations. Rather the determination may be quite lengthy and unacceptably slow down the process of approximating the true color image. Accordingly, the mapping of true colors to palette colors is preferably pre-determined and stored in an expanded intermediate look-up table.

A look-up table which stores a palette color mapping for all 24-bit colors would require 16.8 million entries, requiring millions of bytes of storage. Most computer systems do not have such memory readily available for such a table.

The size of the look-up table may be reduced by employing an ordered dithering process. First, a pixel's true color is converted by ordered dithering to a color in an intermediate palette consisting of colors in a uniform grid and having a color resolution less than true color but greater than the resolution of the displayable color palette. The intermediate palette color is then mapped to the displayable color palette using an intermediate look-up table. By first ordered dithering the true color to an intermediate color, the size of the intermediate look-up table is considerably reduced. However, the ordered dithering process does require additional computation for each pixel being mapped. The size reduction of the look-up table, therefore, is obtained at the cost of some additional computational overhead.

In the preferred embodiment of the invention, the intermediate palette has a color resolution of 15 bits. Five of the 15 bits represent a red intensity value, six of the bits represent a green intensity value, and the remaining four bits represent a blue intensity value. With a color resolution of 15 bits, only 32,768 entries are required in the intermediate look-up table to associate each intermediate color with a color in the displayable color palette. The 15 bit color resolution is preferred for the intermediate palette because ordered dithering to an intermediate palette with such a resolution prior to a table look-up does not significantly affect the mapping of a true color to the displayable palette colors.

Figure 2A:
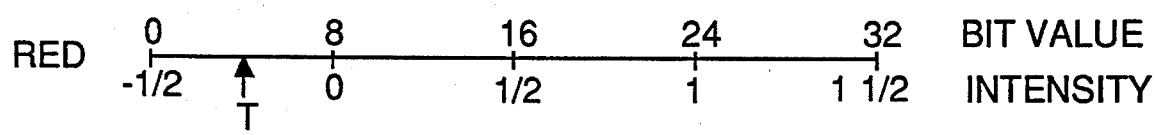
FIGS. 2A–C are illustrations of a dithering technique according to the invention for dithering a modified true color to an intermediate color composed of various intensities of red, green and blue.
Figure 2B:
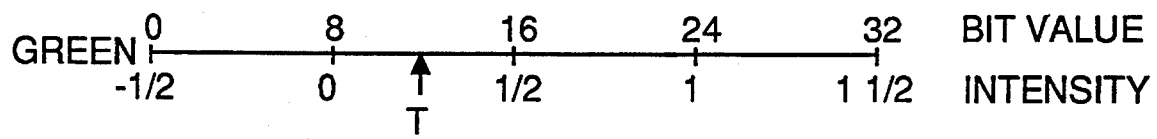
Figure 2C:
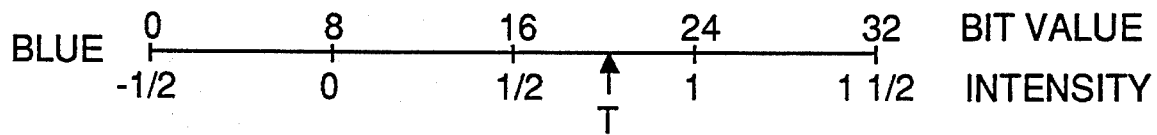

The process of ordered dithering a true modified color to an intermediate color is shown in FIGS. 2A–C. Using the cartesian coordinates (x,y) of the pixel in the color image, a scaling factor is located at the position (x mod 4, y mod 4) in the following preferred threshold matrix:

| 0 | 6/16 | 9/16 | 15/16 |
|---|------|------|-------|
| 11/16 | 13/16 | 2/16 | 4/16 |
| 7/16 | 1/16 | 14/16 | 8/16 |
| 12/16 | 10/16 | 5/16 | 3/16 |

For each of the red green and blue dimensions of the modified true color, an amount of dither equal to the scaling factor multiplied by the spacing between colors in that dimension of the intermediate palette is added to that dimension of the modified true color. The sum of the dither and the modified true color is then truncated in each dimension to the nearest intermediate color.

For example, for a pixel at (10, 13) in the color image, the scaling factor $1/16$ located at (2, 1) in the threshold matrix is used. In the intermediate palette, five bits are used to represent intensities of red light, yielding 32 discrete intensities across a range from [−½, 1½] as shown in FIG. 2A. Since the intermediate palette consists of colors in a uniform grid, the spacing between color values in the red dimension is $2/31$. Therefore, the amount of dither added to the red dimension of the pixel's modified true color T is $1/16$ times $1/16$ or $1/256$. Depending on the value of the modified true color T, the addition of $1/256$ may change its bit value. Similarly, the amount of dither added to the green and blue dimensions is $1/512$ ($1/16 \times 2/63$) and b $1/128$ ($1/16 \times 2/15$), respectively, as shown in FIGS. 2B and C. The sum of the pixel's modified true color and the dither is then truncated to the nearest intermediate true color. More specifically, the sum is truncated to the nearest $1/16$ in the red dimension, the nearest $1/32$ in the green dimension, and the nearest $1/8$ in the blue dimension to yield the nearest intermediate palette color.

Figure 3:
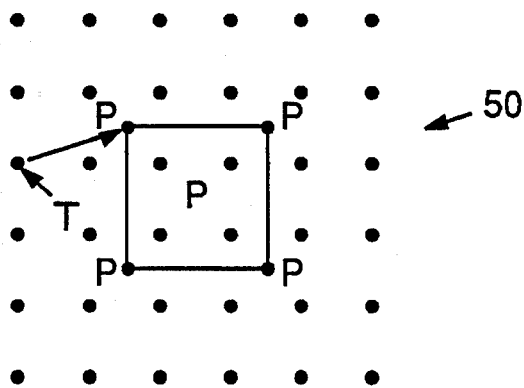
FIG. 3 is a side view of the color model of FIG. 1 showing how an error-adjusted true color value is dithered to an intermediate color value and then the nearest displayable color is looked up in a table.
Figure 4:
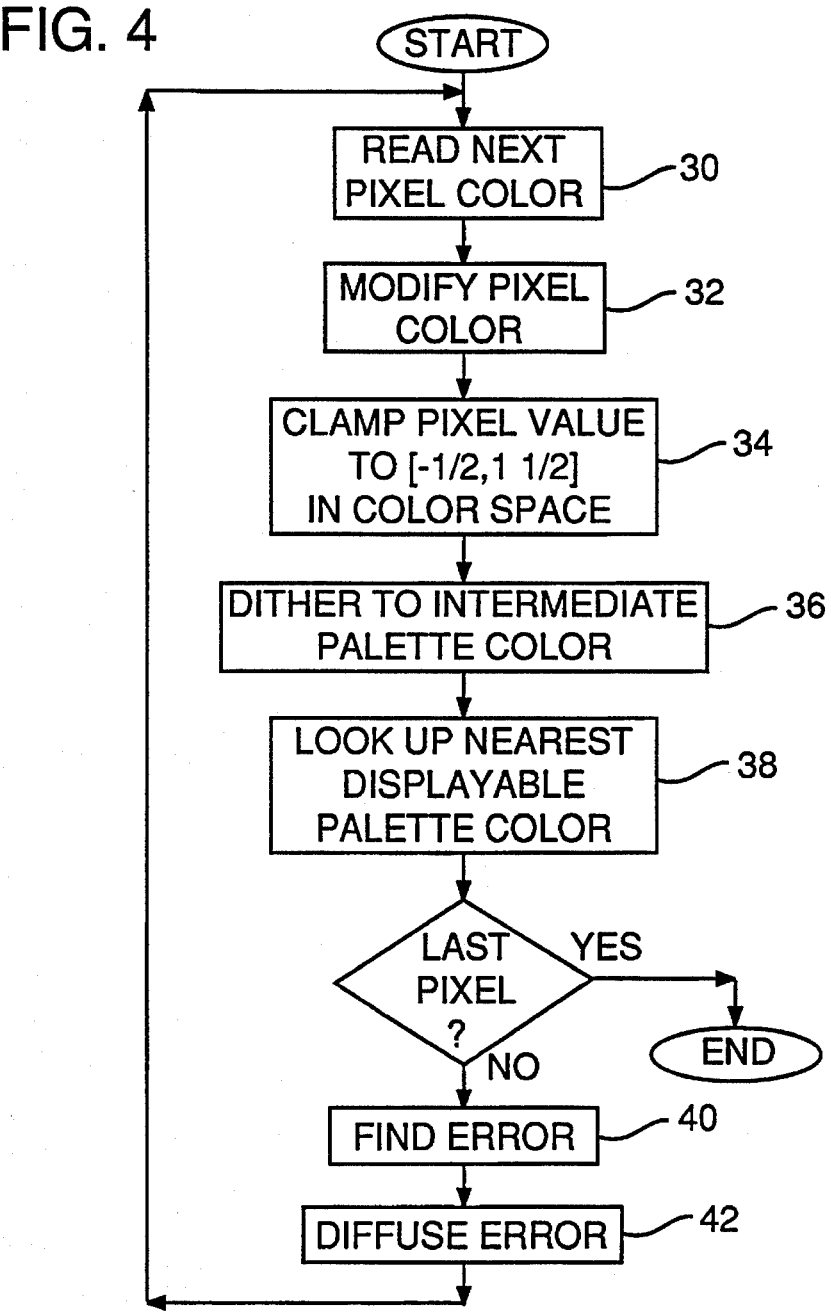
FIG. 4 is a flow chart of a method for rendering an image according to the invention.

With reference to the diagram of FIG. 3 and the flow chart of FIG. 4, the approximating of a true color image with a lower color resolution image can now be readily understood. The method shown in FIG. 4 comprising steps 30–44 is performed once for each pixel in a 24-bit color image. Preferably, the method is performed on each pixel in the image starting at the top left and proceeding left to right across each line of pixels in the image from the top line to the bottom line. However, the order in which the pixels are processed is not critical and can be varied.

In the first step of the method, the true color of a pixel is read from memory where the color image is stored (30). The true color is then modified to the modified true color value T by adding the accumulated error diffused from any previously-rendered neighboring pixels according to an error diffusion technique (32). The error diffused from the neighboring pixels is typically temporarily stored in memory of sufficient size to store error values for the number of pixels affected at one time by the employed error diffusion technique. The modified true color value is then clamped to the bounds of the color model 10 (34). That is, no color intensity can be less than −½ or greater than 1½. At this point the modified true color value T lies within the outer color cube 18, as shown in FIG. 3. The uniform grid of dots 50 represent the 15-bit intermediate color values of the intermediate palette. The modified true color value T is then mapped to the nearest of the intermediate colors, as indicated by the arrow, using the ordered dithering described above (36). These intermediate color values, it should be emphasized, may lie anywhere within the cube 18 including outside the inner cube 22 in which the color values P of the displayable color palette are located, as indicated in FIG. 1.

In the next step (38), the nearest color P in the displayable color palette is looked up through the intermediate table. The entry in the intermediate table is a 4 or 8 bit color number for the displayable color palette depending on the size of the displayable color palette. The pixel is rendered in the reproduced image with a 24-bit, 18-bit or other bit length color value in the displayable color palette associated with the color number.

After the palette color is determined, the method calculates the error between the displayed color and the true color of the pixel (40). The error is simply the directed distance between the two color values in the RGB color model 10. The error in each color dimension is the difference between the bit intensity values for the true color value and the displayed color value. For example, the displayed color may have had a red intensity $1/16$ less than the true color but a blue intensity $1/8$ greater.

In the last step (42), the calculated error is diffused to neighboring pixels that have not yet been rendered, preferably by storing the error temporarily so it can be added to these pixels, as described above in step (32). In the preferred embodiment of the invention, the error is diffused according to the Floyd-Steinberg filter represented by the following matrix:

| 0 | 0 | 0 |
|---|---|---|
| 0 | current pixel | 7/16 |
| 3/16 | 5/16 | 1/16 |

The matrix represents pixels of an image in which the pixels are being mapped from left to right and top to bottom.

The zeros represent pixels that have already been rendered.

According to the Floyd-Steinberg filter, $7/16$ of the calculated error is added to the pixel to the right of the pixel being mapped, $5/16$ to the pixel below, $3/16$ to the pixel below and left, and $1/16$ to the pixel below and right. This "adding" of error may take the form of an addition or a subtraction of color intensity which can result in the several color intensities of the modified true color value being less than zero or greater than one.

Although the Floyd-Steinberg filter is presently preferred, other diffusion filters can be used.

The rendering process is repeated for each pixel of an image. However, the steps (40) and (42) need not be performed for the last pixel since all other pixels will already have been rendered.

Although the invention has been described in the context of an RGB color model, it is not so limited. It can be used as well with other color models such as YUV and YIQ either directly or through techniques such as linear and non-linear transformation.

The present invention including the intermediate table, displayable color palette and described methods can be implemented in an electronic circuit such as in an integrated chip on a display adapter card used in computer systems. Equivalently, the invention can be implemented in software form in an operating system, application program or a display driver. When implemented in software, the described methods are performed by circuitry within the computer system such as microprocessor circuit.

Having described and illustrated the principles of our invention with reference to a preferred embodiment, it should be recognized by those of ordinary skill in the art that embodiment can be modified in arrangement and detail without departing from such principles. In view of the many possible embodiments to which the principles of this invention may be applied, we emphasize that the disclosed embodiment is but one example only of the invention and should not be taken as limiting the invention's scope. Rather, we claim as our invention all embodiments that come within the spirit and scope of the following claims.

We claim:

1. A method of approximating a high color resolution image with a low color resolution image, comprising:
   increasing the boundaries of a color gamut for containing pixel colors;
   for each pixel of the high color resolution image, reading its true color from a memory where the image is stored;
   modifying the true color with error diffused from previously rendered pixels;
   clamping the modified true color to within the increased boundary of the color gamut;
   dithering the modified true color to an intermediate color;
   determining which displayable color of a displayable color palette is nearest to the intermediate color;
   rendering the pixel using a displayable color;
   calculating an error between the displayable color and the true pixel color; and
   diffusing the error to not yet rendered neighboring pixels.

2. The method of claim 1 wherein increasing the boundaries of the color gamut comprises doubling the color gamut.

3. The method of claim 1 wherein clamping the modified true pixel color comprises selecting the nearest color value within the increased color gamut.

4. The method of claim 1 wherein the modifying step comprises adding or subtracting color intensity from each of the color dimensions of the pixel true color.

5. The method of claim 1 wherein the dithering step is an ordered dithering.

6. The method of claim 1 wherein the dithering step comprises reducing a 24-bit true color value to a 15-bit intermediate color value.

7. The method of claim 1 wherein the determining step comprises precomputing a look-up table having as an index intermediate color values and having as entries color numbers to a displayable color palette, the intermediate color values associated with color numbers representing the nearest colors in the displayable color palette.

8. The method of claim 1 wherein the calculating and diffusing steps comprise applying the Floyd-Steinberg error diffusion technique.

9. The method of claim 1 wherein the color gamut is based on a red-green-blue color model.

10. The method of claim 1 wherein the color gamut is based on a YUV color model.

11. A method of approximating a high color resolution image with a low color resolution image, comprising:
    increasing the color gamut of a color model for containing pixel colors;
    for each pixel of the high color resolution image, reading its true color from a memory where the image is stored;
    modifying the true color with error diffused from previously rendered pixels;
    clamping the modified true color to within the boundary of the increased color gamut;
    order dithering the modified true color to an intermediate color;
    looking up in an intermediate table a displayable color nearest to the intermediate color;
    rendering the pixel using the displayable color;
    calculating an error between the displayable color and the true pixel color; and
    diffusing the error to not yet rendered neighboring pixels.

12. A method of approximating a high color resolution image with a low color resolution image, comprising:
    increasing the boundaries of a color gamut for containing pixel colors;
    for each pixel of the high color resolution image, reading its true color;
    modifying the true color with error diffused from previously rendered pixels;
    clamping the modified true color to within the increased boundary of the color gamut;
    dithering the modified true color to an intermediate color;
    looking up in an intermediate table a color number associated with a displayable color nearest to the intermediate color, the displayable color being one of a number in a displayable color palette; and
    rendering the pixel by displaying the displayable color associated with the color number.

13. The method of claim 12 wherein the dithering step is an ordered dithering.

14. The method of claim 12 wherein the dithering step comprises reducing a 24-bit true color value to a 15-bit intermediate color value.

15. The method of claim 12 including precomputing the intermediate table, the table having as an index intermediate color values and having as entries color numbers to the displayable color palette, the intermediate color values associated with color numbers representing the nearest colors in the displayable color palette.

16. The method of claim 12 including diffusing error between the displayed color of a pixel and its true color to not yet rendered neighboring pixels.

17. An apparatus for approximating a high color resolution image with a low color resolution image, comprising:
   means for increasing the boundaries of a color gamut for containing pixel colors;
   means for reading a true color of each pixel of the high color resolution image from a memory where the image is stored;
   means for modifying the true color with error diffused from previously rendered pixels;
   means for clamping the modified true color to within the increased boundary of the color gamut;
   means for dithering the modified true color to an intermediate color;
   means for determining which displayable color of a displayable color palette is nearest to the intermediate color;
   means for rendering the pixel using a displayable color;
   means for calculating an error between the displayable color and the true pixel color; and
   means for diffusing the error to not yet rendered neighboring pixels.

18. A method of approximating a high color resolution image with a low color resolution image, comprising:
   increasing the boundaries of a color gamut for containing pixel colors;
   for each pixel of the high color resolution image, reading its true color from a memory where the image is stored;
   modifying the true color with error diffused from previously rendered pixels;
   clamping the modified true color to within the increased boundary of the color gamut;
   rendering the pixel using a displayable color associated with the modified true color;
   calculating an error between the displayable color and the true pixel color; and
   diffusing the error to not yet rendered neighboring pixels.

19. The method of claim 18 wherein rendering the pixel includes dithering the modified true color to an intermediate color.

20. The method of claim 19 wherein rendering the pixel includes determining which displayable color of a displayable color palette is nearest to the intermediate color.

* * * * *

UNITED STATES PATENT AND TRADEMARK OFFICE
CERTIFICATE OF CORRECTION

PATENT NO.   : 5,455,600
DATED        : October 3, 1995
INVENTOR(S)  : Friedman et al.

It is certified that error appears in the above-indentified patent and that said Letters Patent is hereby corrected as shown below:

At column 4, lines 37-38 change "the-extended" to --the extended--.

At column 5, line 63 change "and b 1/128" to --and 1/128--.

In the Claims:
At column 8, line 66 change "having as entries color numbers" to --having as entries the color numbers--.

Signed and Sealed this

Twenty-first Day of May, 1996

Attest:

BRUCE LEHMAN

Attesting Officer      Commissioner of Patents and Trademarks